United States Patent
Cline et al.

(10) Patent No.: US 8,380,029 B2
(45) Date of Patent: Feb. 19, 2013

(54) FIBER OPTIC CABLE FURCATION METHODS AND ASSEMBLIES

(75) Inventors: Timothy S. Cline, Granite Falls, NC (US); William C. Hurley, Hickory, NC (US); Eric R. Logan, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 305 days.

(21) Appl. No.: 12/826,147

(22) Filed: Jun. 29, 2010

(65) Prior Publication Data

US 2011/0317968 A1 Dec. 29, 2011

(51) Int. Cl.
*G02B 6/44* (2006.01)

(52) U.S. Cl. .......................... 385/104; 385/111

(58) Field of Classification Search .................. 385/111, 385/113, 103, 106, 112, 104
See application file for complete search history.

(56) References Cited

U.S. PATENT DOCUMENTS

| | | | | |
|---|---|---|---|---|
| 4,828,352 A | * | 5/1989 | Kraft | 385/111 |
| 5,121,458 A | * | 6/1992 | Nilsson et al. | 385/100 |
| 5,390,273 A | * | 2/1995 | Rahman et al. | 385/112 |
| 5,703,983 A | * | 12/1997 | Beasley, Jr. | 385/104 |
| 5,888,100 A | * | 3/1999 | Bofill et al. | 439/676 |
| 5,905,834 A | * | 5/1999 | Anderson et al. | 385/111 |
| 7,272,283 B2 | * | 9/2007 | Temple et al. | 385/114 |
| 7,590,321 B2 | * | 9/2009 | Lu et al. | 385/104 |
| 7,955,004 B2 | * | 6/2011 | DiMarco | 385/100 |
| 2010/0067856 A1 | * | 3/2010 | Knoch et al. | 385/111 |
| 2011/0268398 A1 | * | 11/2011 | Quinn et al. | 385/100 |

OTHER PUBLICATIONS

Corning Cable Systems LLC, Standard Recommended Procedure (SRP) 000-257, Issue 1, Nov. 2007, pp. 1-4.
Corning Cable Systems LLC, Standard Recommended Procedure (SRP) 004-203, Issue 1, Jul. 2006, pp. 1-6.
Corning Cable Systems LLC, Specification Sheet EVO-29-EN, pp. 1-16.
Corning Cable Systems LLC, Specification Sheet EVO-163-EN, pp. 1-4.

* cited by examiner

*Primary Examiner* — Charlie Peng

(57) ABSTRACT

Fiber optic cable furcation methods and assemblies are disclosed, wherein the method includes removing an end portion of the cable outer jacket from the fiber optic cable to expose end portions of the micromodules contained within. The method also includes helically stranding the exposed micromodule end portions to form a stranded section having a stranded configuration that includes at least three turns and that substantially immobilizes the optical fibers within their respective micromodules. The method also includes arranging a maintaining member on at least a portion of the stranded section to maintain the stranded configuration.

27 Claims, 10 Drawing Sheets

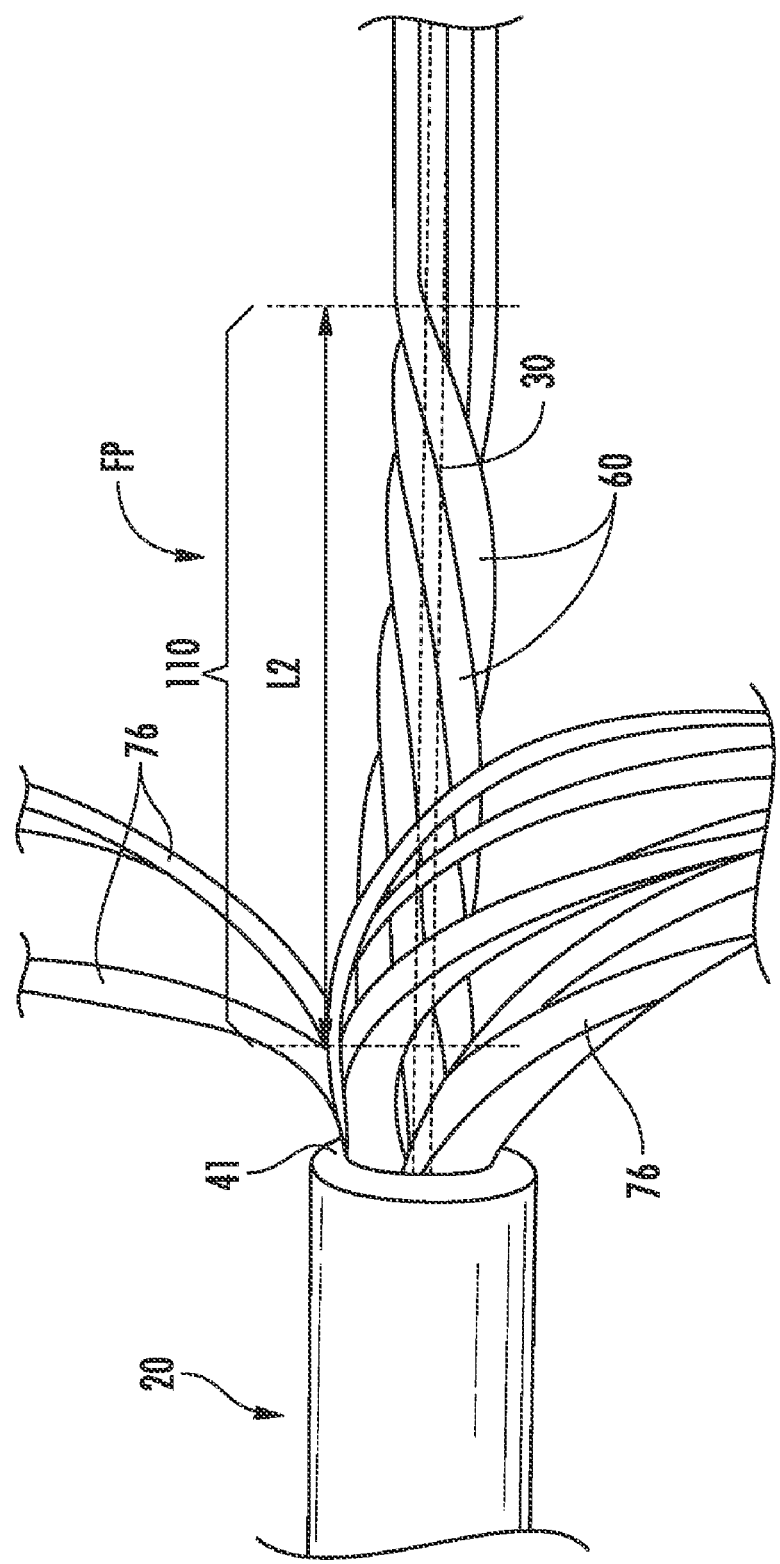

FIBER OPTIC CABLE FURCATION METHODS AND ASSEMBLIES

FIELD

The present disclosure relates generally to fiber optic cables and in particular to fiber optic cable furcation methods and assemblies.

BACKGROUND

Fiber optic cables carry optical fibers capable of transmitting optical voice, video, and data signals with greater bandwidth than electrical cables. As businesses and households demand increased data capacity, fiber optic telecommunications networks based on fiber optic cables are displacing conventional wire-based electrical voice, video, and data signal carriers.

Fiber optic cables used in telecommunications networks can include multiple optical fibers. One such fiber optic cable includes an outer jacket that contains a plurality of loose buffer tubes that each contain one or more loosely arranged optical fibers. Such cables are capable of optically transmitting large amounts of data over the optical fibers and are typically designed as trunk cables for optical telecommunications networks. The looseness of the buffer tubes and the optical fibers within allow the fiber optic cable to be bent, twisted and otherwise manipulated without imparting substantial strain on the buffer tubes and the optical fibers carried within.

When such fiber optic cables are used in a telecommunications network, they need to be connected to optical fiber connectors, such as one or more multifiber connectors. Multifiber connectors are used to interface the optical fibers carried in the cable with other equipment in the telecommunications network, such as a connector module in a data center. Connecting the optical fibers to a multifiber connector usually involves separating (furcating) the buffer tubes at a furcation point, accessing the optical fibers within the buffer tubes, and then connecting the ends of the optical fibers to the multifiber connector.

If the optical fibers carried in loose buffer tubes are connected directly to a multifiber connector without first being immobilized at the furcation point, their movement can adversely impact the performance of the connectorized cable assembly and even cause system failures. For example, changes in the relative lengths of the buffer tubes and the fibers carried within can impart strain to the optical fibers, and this strain can be communicated to the multifiber connector. It is therefore important to ensure that the optical fibers carried by the cable are immobilized at the furcation point when connecting the optical fiber ends to one or more multifiber connectors.

Furcation methods involve cutting the buffer tubes, then sliding furcation tubes over exposed optical fiber end portions while leaving a small gap between the buffer tube end and the furcation tube end so that a portion of the optical fibers are exposed. The furcation tubes are then attached to the exposed optical fiber portions and to the buffer tubes using an epoxy, thereby immobilizing the optical fibers at the furcation point. While the optical fibers are loosely held in the furcation tubes, their being immobilized at the furcation point keeps the length of the optical fibers and the furcation tubes roughly equal over the relatively short length of the furcation tubes, thereby reducing or preventing stress in the fibers within the cable from being transferred into the connector. A furcation jacket is then arranged at the furcation point to cover the epoxied furcation tubes, buffer tubes and optical fibers for added support and protection. Once these steps are performed, the entire assembly needs to remain in a fixed, vertical position while the epoxy cures. While effective, this fiber optic cable furcation method is time consuming and labor intensive.

SUMMARY

An aspect of the disclosure is a method of furcating a fiber optic cable having an outer jacket and that contains multiple micromodules each having a buffer tube that contains at least one optical fiber. The method includes removing an end portion of the outer jacket from the fiber optic cable to expose end portions of the micromodules. The method also includes helically stranding the exposed micromodule end portions to form a stranded section having a stranded configuration that includes at least three turns and that substantially immobilizes the optical fibers within their respective buffer tubes. The method further includes arranging a maintaining member on at least a portion of the stranded section to maintain the stranded configuration.

Another aspect of the disclosure is a fiber optic cable furcation assembly. The assembly includes a fiber optic cable having an outer jacket that defines a cable interior that contains multiple micromodules, with each micromodule having a buffer tube that contains at least one optical fiber, the outer jacket having an end through which extends end portions of the micromodules. The assembly also includes a stranded section of the micromodule end portions, the stranded section having a stranded configuration that includes at least three turns and that substantially immobilizes the optical fibers within their respective buffer tubes. The assembly also has a maintaining member arranged on at least a portion of the stranded section, with the maintaining member configured to maintain the stranded configuration of the stranded section.

Another aspect of the disclosure is a fiber optic cable furcation assembly. The assembly includes a fiber optic cable having an end and that contains multiple micromodules, with each micromodule containing at least one optical fiber. The micromodules have end portions that extend from the cable end. The micromodule end portions are unidirectionally helically stranded to define a stranded section having a stranded configuration with at least three turns to substantially immobilize the optical fibers within their respective micromodules. The assembly has a maintaining member arranged on at least a portion of the stranded section. The assembly further includes a plurality of multifiber connectors optically connected to the optical fibers.

Additional features and advantages of the present disclosure are set out in the detailed description that follows, explaining the principles and operations thereof, and will also be readily apparent to those of ordinary skill in the art from the description and/or recognized by practicing the disclosure as described. It is to be understood that the general description above and the detailed description which follows present exemplary embodiments of the disclosure, which are intended to provide an overview and framework for understanding the nature and character of the disclosure as it is claimed. The accompanying drawings are incorporated into and constitute a part of this specification, illustrating and further highlighting the exemplary embodiments of the present disclosure.

These and other advantages of the disclosure will be further understood and appreciated by those skilled in the art by reference to the following written specification, claims and appended drawings.

BRIEF DESCRIPTION OF THE DRAWINGS

A more complete understanding of the present disclosure may be had by reference to the following detailed description when taken in conjunction with the accompanying drawings, wherein:

FIG. 7C is similar to FIG. 7B, and illustrates an example where the fiber optic cable includes a central strength member such as shown in FIG. 4B, and wherein the micromodules are stranded around the strength member at the stranded section.

DETAILED DESCRIPTION

Reference is now made in detail to the embodiments of the present disclosure, examples of which are illustrated in the accompanying drawings. Whenever possible, like reference numbers are used to refer to like components or parts.

Figure 1:
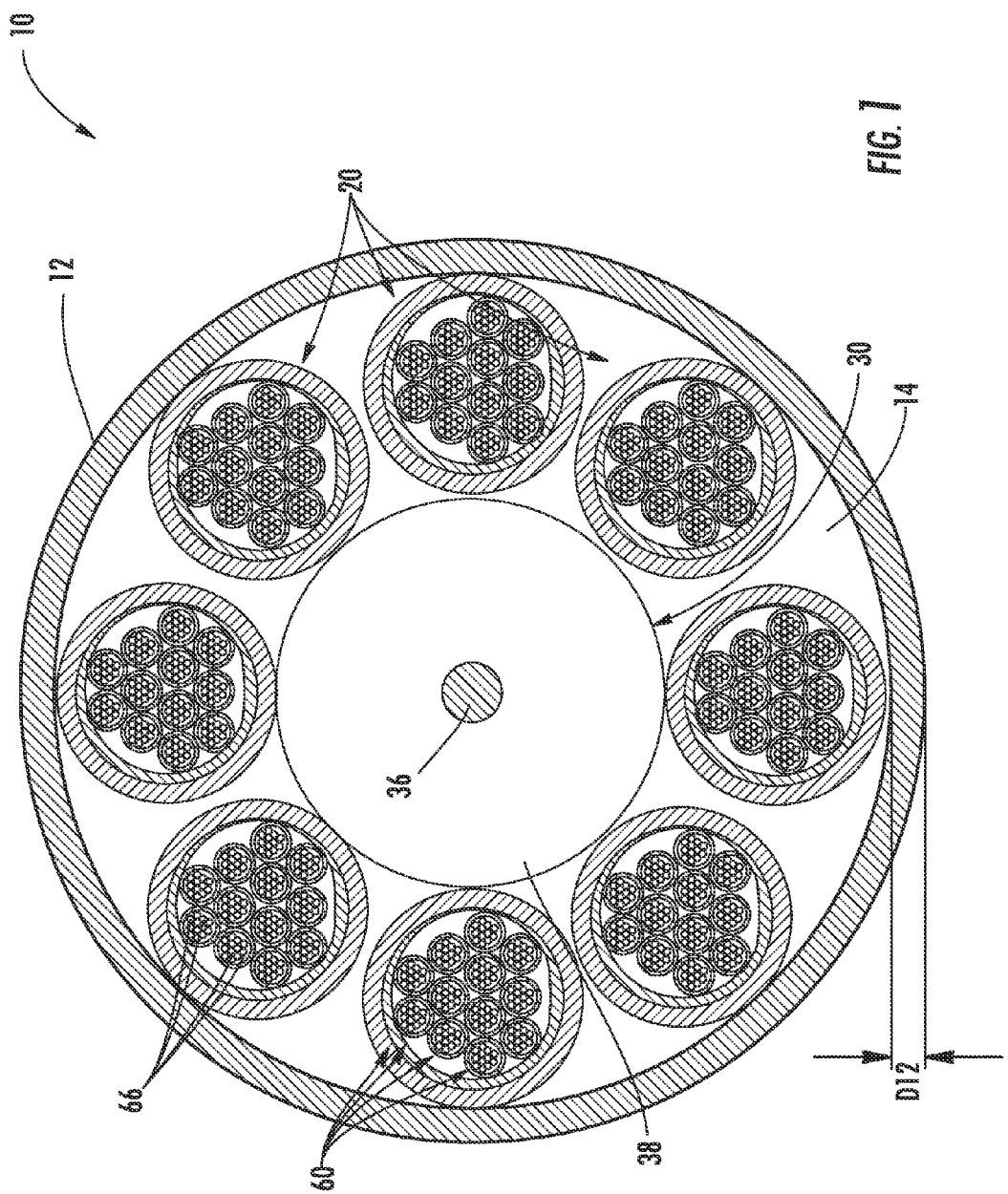
FIG. 1 is a cross-sectional view of an example optical micromodule break-out cable.

FIG. 1 is a cross section of an example optical micromodule cable 10 having an outer jacket 12 with a thickness D12 and that defines an interior 14 and a generally circular cross-section. Optical micromodule cable 10 comprises a plurality of fiber optic cables ("cables") 20 contained in interior 14 and arranged (e.g. stranded) around a strength member 30, which is shown as being centrally (axially) located in interior 14. Strength member 30 can include, for example, a relatively stiff member 36 of fiber or glass-reinforced plastic (GRP), or a relatively flexible combination of aramid fiber that may include an overcoating of plastic material 38. The outer jacket 12 can be formed from, for example, a polymer material, and may be reinforced with fibers, etc. (not shown).

The example embodiment of optical micromodule cable 10 of FIG. 1 has eight cables 20, and each cable has twelve micromodule subunits ("micromodules") 60, with each micromodule including twelve optical fibers 66. The total number of optical fibers 66 carried by optical micromodule cable 10 is therefore 1152. Other numbers of cables 20, micromodules 60, and optical fibers 66 can be employed for various applications. The optical micromodule cable 10, the cables 20 and the micromodules 60 all have generally circular cross-sections, although other cross-sections may be used. Cable 10 of FIG. 1 can also be referred to as an optical micromodule break-out cable, and the cables 20 carried therein can be referred to as break-out cables or break-out units.

Figure 2:
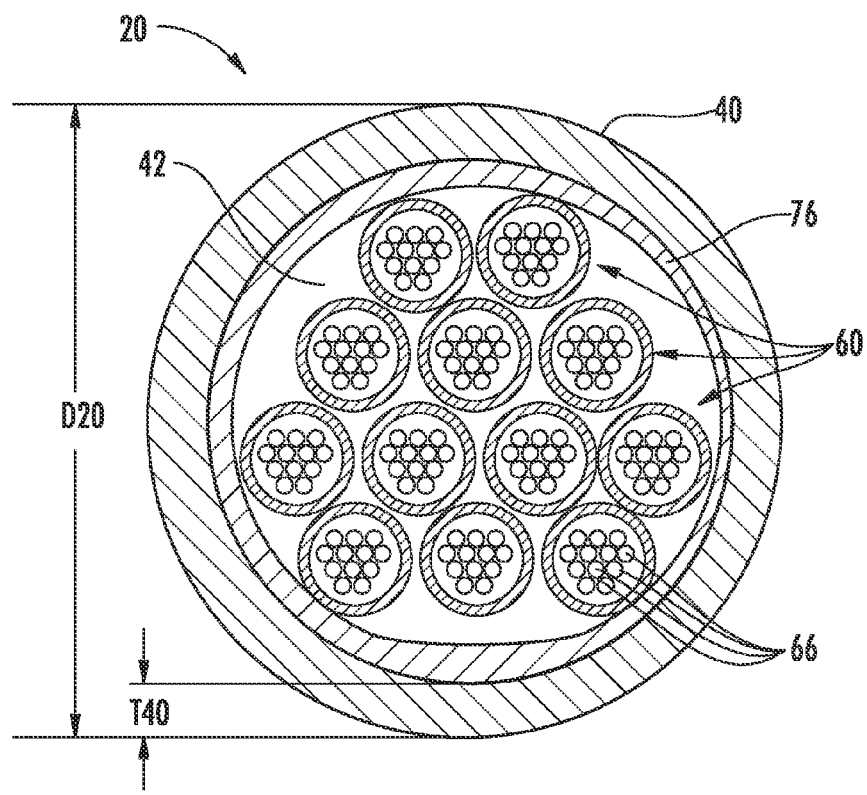
FIG. 2 is a cross-sectional view of one of the fiber optic break-out units carried by the optical micromodule break-out cable of FIG. 1.

FIG. 2 is a cross section of an example cable 20 having a diameter D20. Each cable 20 includes its own outer jacket 40 of thickness T40 and that defines an interior 42 that contains a plurality of micromodules 60. Micromodules 60 each include a buffer tube 62 that defines an interior 64 containing at least one optical waveguide such as at least one optical fiber 66. Buffer tube 62 has a thickness D62. Exemplary micromodules 60 are not stranded within the cables 20, although some degree of stranding may be used for certain applications. For example, the micromodules 60 can be twisted in helical fashion with respect to one another, in particular when a plurality of or all of the micromodules 60 are arranged in such a way that they are rotated with a specified lay length. In the present disclosure, any stranding of micromodules 60 (except for that at the furcation point FP, discussed below) is generally considered to be loose, i.e., so that the optical fibers 66 are free to move within their respective buffer tubes 62.

With continuing reference to FIG. 2, a strain-relief element 76 may be disposed in cable interior 42 adjacent jacket 40 and surrounding micromodules 60. Strain-relief element 76 may include, for example, a layer of yarn or yarns (e.g. aramid yarn) for absorbing tensile loads. Strain-relief element 76 is shown with a non-uniform thickness because the locations of the micromodules 60 may cause the strain-relief element to compress at various locations along the length of the cable 20.

Figure 3:
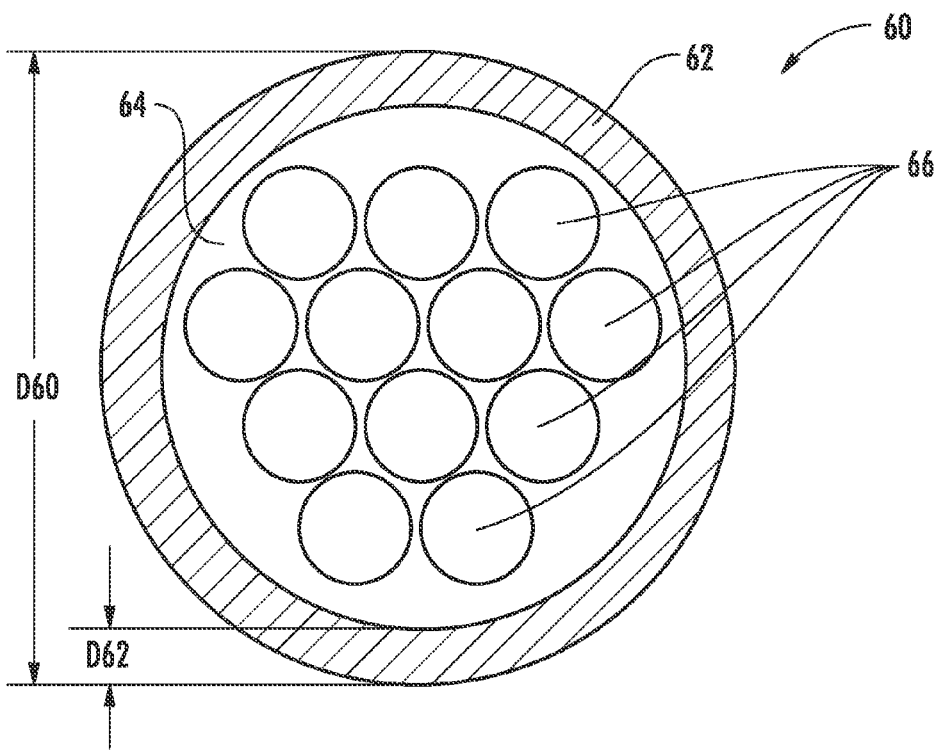
FIG. 3 is a cross-sectional view of an example micromodule as carried by one of the fiber optic break-out units of FIG. 2.

FIG. 3 is a cross section of a micromodule 60 having a diameter D60. In an example, buffer tubes 62 are made of a polymer and are formed as a polymeric sheath. Buffer tubes 62 have a thickness D62.

The furcation assemblies and methods of the disclosure are discussed herein in connection with cable 20 by way of illustration. Cable 20 can be constructed of selected materials of selected thicknesses such that it has riser or plenum burn ratings according to desired specifications. Micromodules 60 can also be constructed so that they are relatively robust, such that they are suitable for field use, while also providing a desired degree of accessibility. For example, micromodules 60 can be constructed with relatively thick buffer tubes 62, e.g., on the order of D62=0.2 mm or more, so that the exposed micromodules that form part of the fiber optic cable furcation assembly (discussed below) provide sufficient protection for the optical fibers 66 contained therein Cable jacket 40 and buffer tubes 62 can also be formed from fire-retardant materials to obtain a desired plenum burn rating. For example, highly-filled PVC of a specified thickness can be used to form buffer tubes 62. One well-known plenum burn standard is the National Fire Protection Act Standards (NFPA) 262 burn test. NFPA 262 prescribes the methodology to measure flame travel distance and optical density of smoke for insulated, jacketed, or both, electrical wires and cables and fiber optic cables that are to be installed in plenums and other spaces used to transport environmental air without being enclosed in raceways. Cables 20 may be constructed to be low skew within micromodules 60 so that they are suitable for use in parallel optic transmission systems. Skew is generally defined as the difference in the time of flight of optical signals for the fibers within a module and has units of picoseconds per meter (ps/m).

Figure 4A:
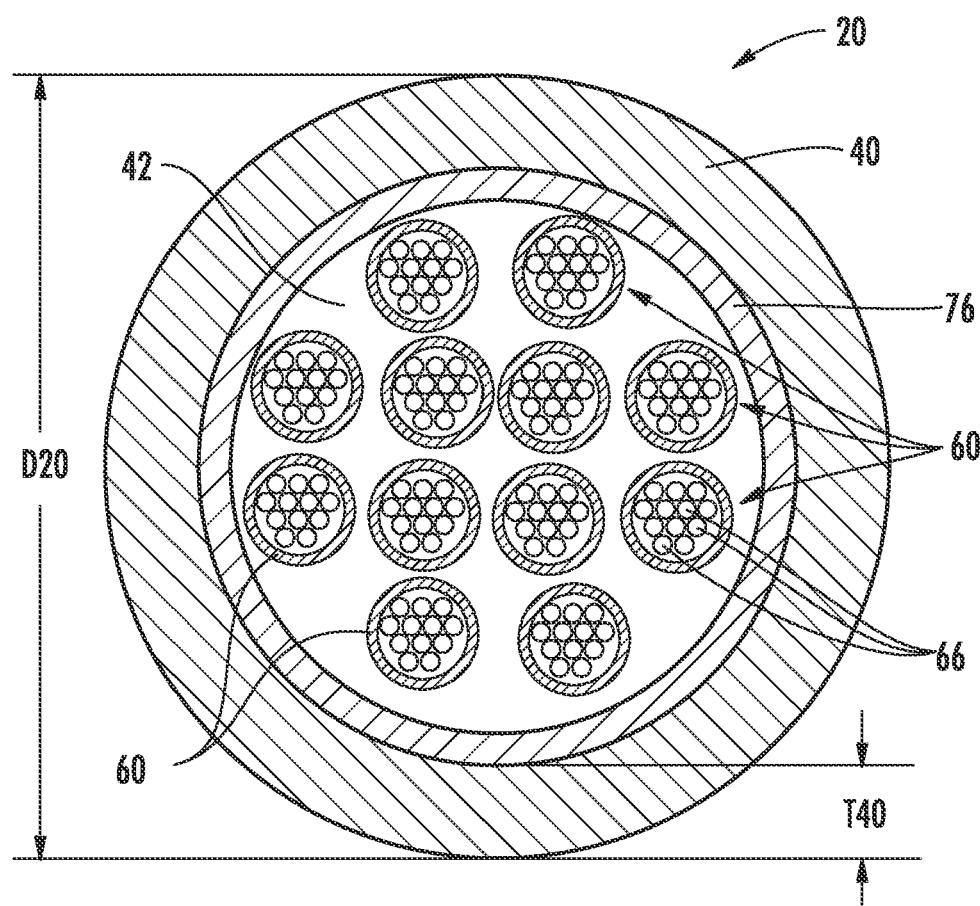
FIG. 4A is a cross-sectional view similar to FIG. 2 and illustrates an example of a fiber optic trunk cable.

FIG. 4A is a cross-sectional view of another example cable 20 similar to that of FIG. 2, but wherein jacket 40 is thicker to provided added protection of micromodules 60 carried in interior 42. The interior 42 of the cable 20 of FIG. 4 may also be sized to allow for greater spacing of the micromodules 60. Cable 20 of FIG. 4A can be referred to as a "trunk cable."

Figure 4B:
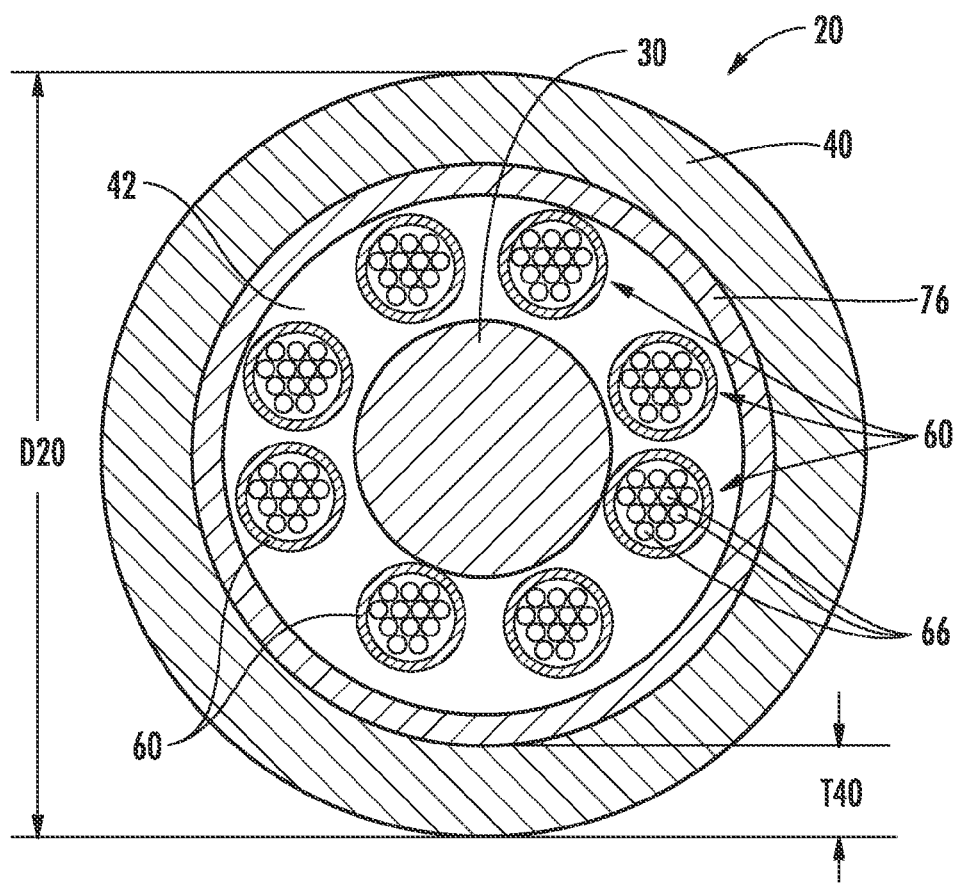
FIG. 4B is similar to FIG. 4A, and illustrates an embodiment of the fiber optic trunk cable having an axial strength member similar to that shown in the optical micromodule break-out cable of FIG. 1.

FIG. 4B is similar to FIG. 4A, and illustrates an embodiment of cable 20 that includes at least one central strength member 30. Cable 20 of FIG. 4B illustrates an embodiment similar to that shown in the optical micromodule cable of FIG. 1 wherein the strength member 30 is centrally (axially) disposed.

Figure 5:
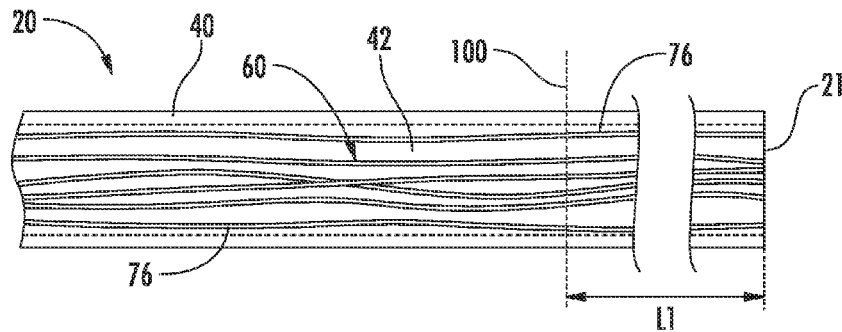
FIG. 5 is a side view of an end portion of an example fiber optic cable having an end and showing the micromodules contained within cable interior prior to removing an end portion of the cable jacket to expose the micromodules.

FIG. 5 is a side view of an end portion of an example cable 20 having an end 21 and showing micromodules 60 contained within cable interior 42. FIG. 5 also shows a location 100 a distance L1 from end 21 where cable jacket 40 is to be cut to form a furcation point (discussed below). The furcation point is formed by removing an end portion of jacket 40 to expose end portions of micromodules 60 in anticipation of connecting the optical fibers 66 (not shown in FIG. 5) carried by the micromodules to one or more multifiber connectors.

Figure 6A:
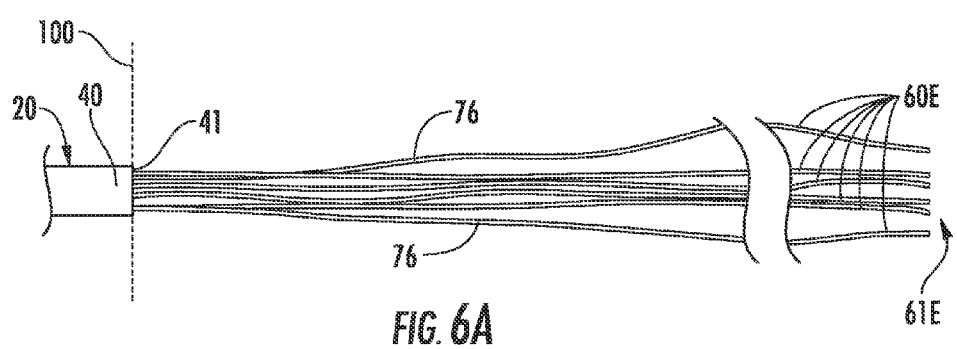
FIG. 6A is a side view of the fiber optic cable of FIG. 5, showing the cable after an end portion of the cable jacket has been removed to expose end portions of the micromodules that extend from the cable jacket end.
Figure 6B:
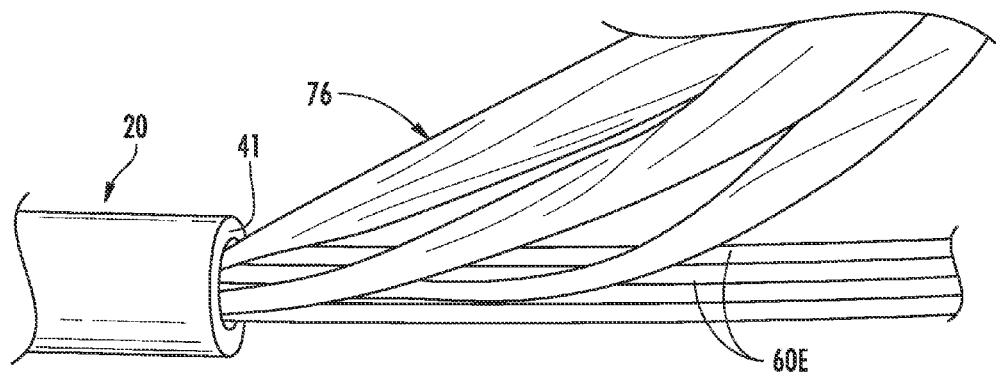
FIG. 6B is a close-up view of a fiber optic cable similar to that of FIG. 6A, showing four exposed micromodules and the exposed yarn strength member at the cable jacket end.

FIG. 6A is a side view of cable 20 and shows the cable after jacket 40 has been cut at location 100 and an end portion of the jacket removed, thereby forming a jacket end 41. This exposes end portions of micromodules 60 and an end portion of strain-relief member 76. Six micromodules 60 are shown in FIG. 6A by way of illustration. FIG. 6B is a close-up perspective view of a cable 20 similar to that of FIG. 6A, wherein the cable is shown carrying four micromodules 60 by way of example, with the four micromodules extending from jacket end 41. Exposed micromodules 60 are denoted 60E and have ends 61E. In FIG. 6B, strain-relief member 76 is shown in the form of yarn by way of illustration.

Figure 7A:
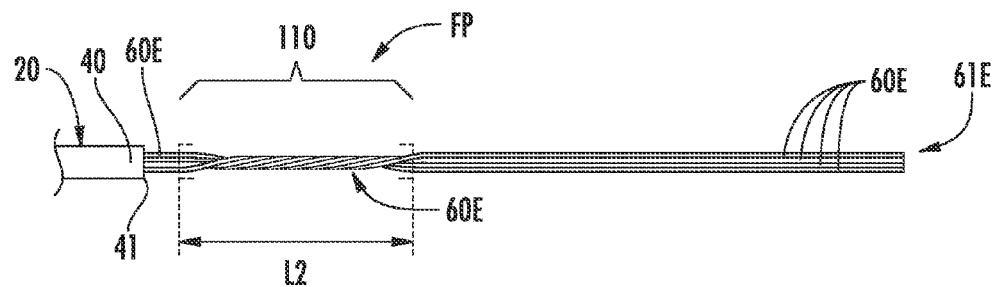
FIG. 7A is similar to FIG. 6A, except that the exposed micromodules are now stranded over a stranded section with a lay length L2.
Figure 7B:
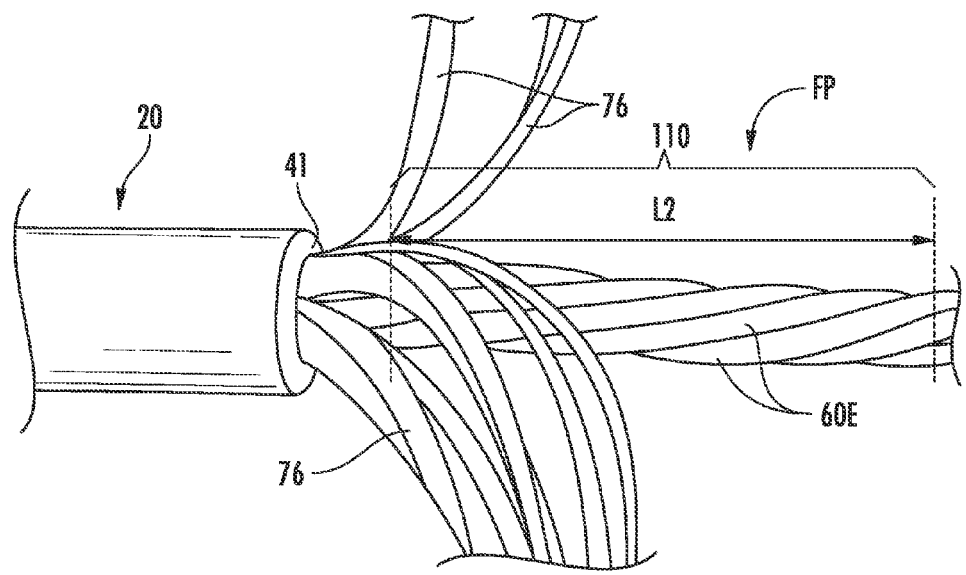
FIG. 7B is a close-up view of the fiber optic cable of FIG. 7A at the jacket end and showing the stranded section and the exposed yarn strength member.

FIG. 7A is similar to FIG. 6A, except that the exposed micromodules 60E are now stranded over a stranded section 110 having a lay length L2. FIG. 7B is a close-up view of cable 20 of FIG. 7A at jacket end 41 and shows stranded region 110 and lay length L2. In an example, exposed micromodules 60E are unidirectionally and helically stranded in a manner that does not violate the minimum bend radius $R_{MIN}$ of optical fibers 66 within the buffer tubes 62, but that provides sufficient contact between the optical fibers and their respective buffer tubes to substantially immobilizing the optical fibers within the buffer tubes. The cable jacket end 41 and the stranded section 110 of stranded micromodules 60E generally define the furcation point FP. In an example, stranded section 110 is located immediately adjacent cable jacket end 41, or is relatively close thereto, and the furcation point may include 20 mm of the end of the cable jacket. In an example, exposed micromodules 60E are stranded by hand to form stranded section 110.

In an example illustrated in FIG. 7C, cable 20 includes strength member 30 (see e.g., FIG. 4B) and stranded section 110 includes the strength member, which is shown in phantom. In an example, exposed micromodules 60E are stranded around strength member 30. This use of strength member 30 in stranded section 110 provides added support and assists in maintaining the stranded configuration of exposed micromodules 60E. Strength member 30 can be terminated at or near the end of stranded section 110 opposite the cable jacket end 41 in cases where its use is no longer required beyond that point.

The bending radius R of the micromodules 60 when helically stranded in a single direction can be calculated using the equation $R=\{P^2/2\pi^2 D'\}+\{D'/2\}$, where P is the pitch or lay length, and D' is the pitch circle diameter. In an example, exposed micromodules 60E are helically wound in a single direction with at least three helical wraps (turns) to provide sufficient contact between optical fibers 66 and their buffer tubes 62 to substantially immobilize the optical fibers. In example embodiments, the pitch/lay length P=L2 as denoted in the pertinent Figures is in the range of 10 mm$\leq$L2$\leq$100 mm, or preferably 15 mm$\leq$L2$\leq$50 mm, or more preferably in the range of 15 mm$\leq$L2$\leq$20 mm.

By way of example, for exposed micromodules 60E stranded with a pitch/lay length P=L2=17 mm with a pitch circle diameter D'=1.6 mm (which is an example buffer tube diameter), the bend radius R is about 37 mm, which is substantially larger than the minimum bend radius $R_{MIN}$ for most optical fibers 66. Consequently, this amount of bending would not lead to significant bend-induced attenuation. Example optical fibers 66 include multi-mode, bend-insensitive optical fibers, such as the CLEAR CURVE® optical fiber, available from Corning, Inc., Corning, N.Y.

Figure 8:
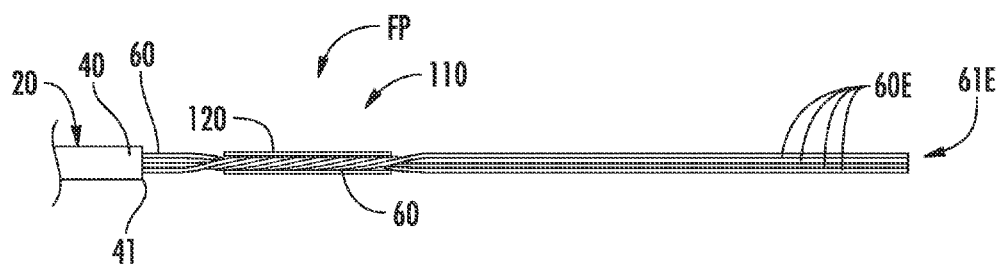
FIG. 8 is a side view of the fiber optic cable similar to FIG. 7A, and further includes a maintaining member applied to the stranded micromodules at the furcation point.

FIG. 8 is a side view of cable 20 after exposed micromodules 60E are stranded as discussed above, and shows a maintaining member 120 arranged on (e.g., applied to) the stranded exposed micromodules 60E at furcation point FP over at least a portion of stranded section 110 to maintain the micromodules in their stranded configuration. In an example, maintaining member 120 extends the entire lay length L2 of stranded section 110. Examples of maintaining member 120 include tape, strapping, shrink tubing, shrink-wrap, binder, yarn, epoxy, urethane sealant, adhesive material, and combinations thereof.

Figure 9:
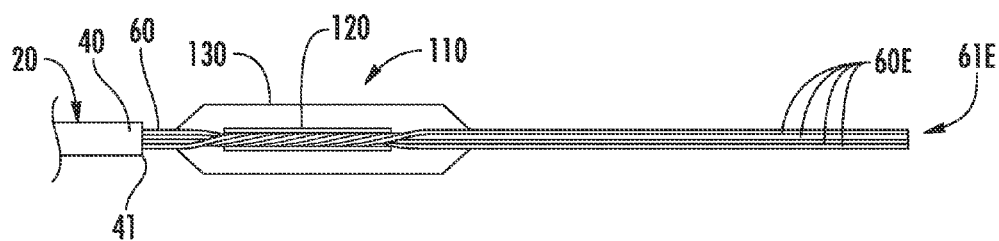
FIG. 9 is similar to FIG. 8 and illustrates an example where a furcation body is optionally added at the furcation point over maintaining member.

FIG. 9 is similar to FIG. 8 and illustrates an example where a furcation body 130 is optionally added at furcation point FP, i.e., is disposed on (e.g., secured to, fixed to, etc.) at least a portion of maintaining member 120. Furcation body 130 adds protection to the stranded, exposed micromodules 60E at furcation point FP and can also serve to further secure the exposed micromodules in their stranded configuration. Furcation body 130 can also facilitate handling of the final cable assembly by providing a gripping/handling location for use by field personnel. In an example, furcation body 130 extends beyond stranded section, as shown in FIG. 9.

Figure 10:
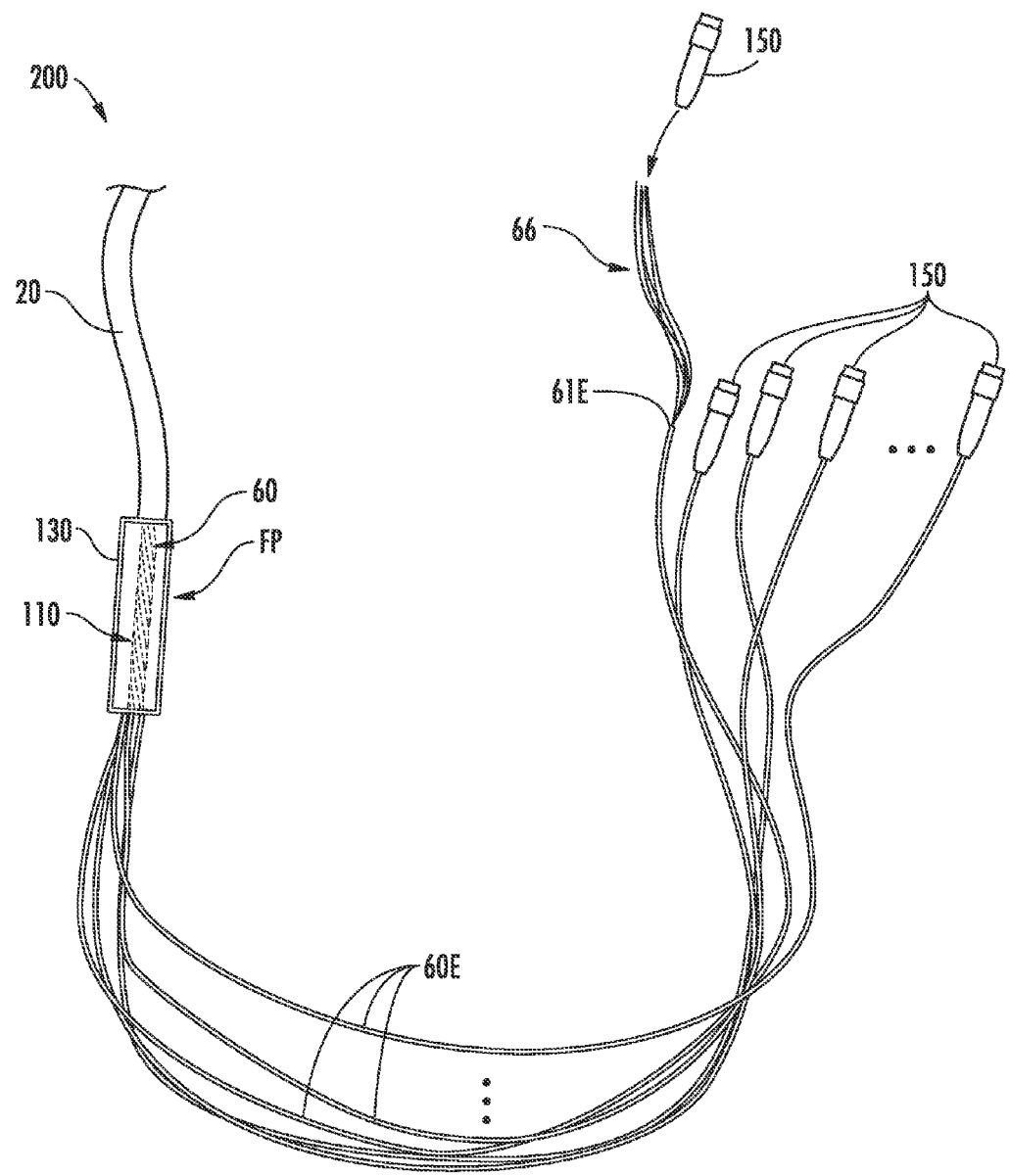
FIG. 10 is a schematic diagram of the fiber optic cable after the furcation body is added and wherein the optical fibers carried in the exposed micromodules are in the process of being connected to respective multifiber connectors.

FIG. 10 is a schematic diagram of the cable 20 after furcation body 130 is added and wherein the optical fibers 66 carried in the exposed micromodules 60E are in the process of being connected to respective multifiber connectors 150 to form a connectorized cable assembly 200. One multifiber connector 150 is shown as awaiting connection to the exposed optical fibers 66 of one of the exposed micromodules 60E. An example multifiber connector 150 is an MTP connector. Also in an example, the optical fibers 66 in a given buffer tube 62 are connected to a corresponding multifiber connector 150.

Figure 11:
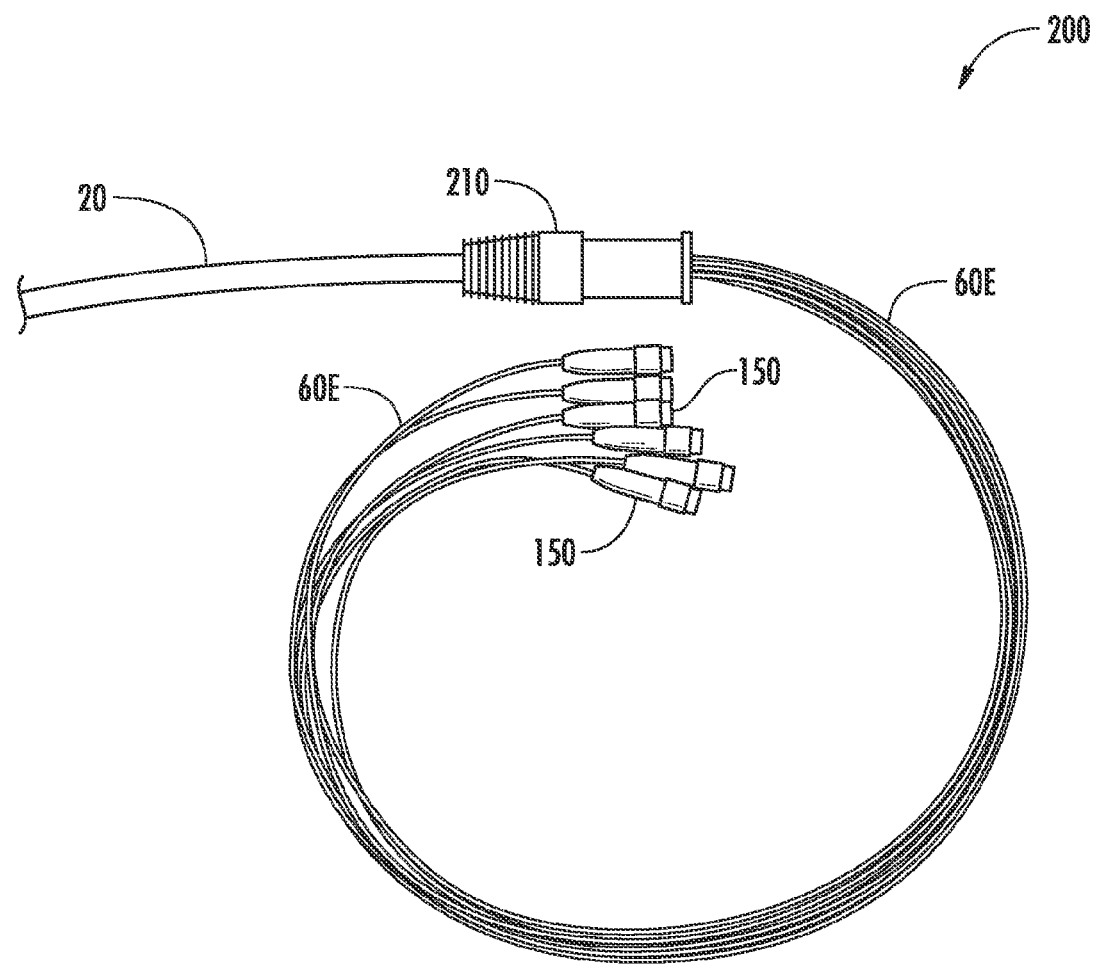
FIG. 11 is side view of a connectorized cable assembly comprising a fiber optic cable having the aforementioned stranded section and multifiber connectors connected to the optical fibers at respective ends of the exposed micromodules.

FIG. 11 is side view of a completed connectorized cable assembly 200 comprising cable 20 having stranded section 110 and multifiber connectors 150 connected to optical fibers 66 at the ends of the exposed micromodules 60E.

Although the embodiments herein have been described with reference to particular features, it is to be understood that these embodiments are merely illustrative of the principles and applications thereof. It is therefore to be understood that numerous modifications may be made to the illustrative embodiments and that other arrangements may be devised without departing from the scope of the appended claims.

What is claimed is:

1. A method of furcating a fiber optic cable having an outer jacket and that contains multiple micromodules each having a buffer tube that contains at least one optical fiber, comprising:
removing an end portion of the outer jacket from the fiber optic cable to expose end portions of the micromodules;
helically stranding the exposed micromodule end portions to form a stranded section having a stranded configuration that includes at least three turns and that substantially immobilizes the optical fibers within their respective buffer tubes; and
arranging a maintaining member on at least a portion of the stranded section to maintain the stranded configuration.

2. The method of claim 1, further comprising disposing a furcation body on at least a portion of the maintaining member.

3. The method of claim 1, further comprising connecting the optical fibers to at least one multifiber connector.

4. The method of claim 1, further comprising providing the maintaining member from the group of maintaining members comprising: tape, strapping, shrink tubing, shrink-wrap, binder, yarn, epoxy, urethane sealant, adhesive material, and combinations thereof.

5. The method of claim 1, wherein the fiber optic cable comprises a strength member, the method further comprising performing the helical stranding around the strength member.

6. The method of claim 1, further comprising forming the stranded portion to have a lay length of between 10 mm and 100 mm.

7. The method of claim 6, further comprising forming the stranded portion to have a lay length of between 15 mm and 50 mm.

8. The method of claim 7, further comprising forming the stranded portion to have a lay length of between 15 mm and 20 mm.

9. The method of claim 1, wherein the micromodules contained within the fiber optic cable are either generally unstranded or loosely stranded.

10. An optic fiber cable furcation assembly, comprising:
a fiber optic cable having an outer jacket that defines a cable interior that contains multiple micromodules, with each micromodule having a buffer tube that contains at least one optical fiber, the outer jacket having an end through which extends end portions of the micromodules;
a stranded section of the micromodule end portions, the stranded section extending between respective unstranded sections of the multiple micromodules and having a stranded configuration that includes at least three turns and that substantially immobilizes the optical fibers within their respective buffer tubes, wherein the micromodules contained within the unstranded sections of the fiber optic cable are either generally unstranded or more loosely stranded than in the stranded section of the micromodule end portions; and
a maintaining member arranged on at least a portion of the stranded section, the maintaining member configured to maintain the stranded configuration of the stranded section.

11. An optic fiber cable furcation assembly, comprising:
a fiber optic cable having an outer jacket that defines a cable interior that contains multiple micromodules, with each micromodule having a buffer tube that contains at least one optical fiber, the outer jacket having an end through which extends end portions of the micromodules;
a stranded section of the micromodule end portions, the stranded section having a stranded configuration that includes at least three turns and that substantially immobilizes the optical fibers within their respective buffer tubes;
a maintaining member arranged on at least a portion of the stranded section, the maintaining member configured to maintain the stranded configuration of the stranded section; and
a furcation body disposed on at least a portion of the maintaining member.

12. The assembly of claim 10, further comprising at least one multifiber connector optically connected to the optical fibers.

13. The assembly of claim 12, wherein each buffer tube includes multiple optical fibers, with the multiple optical fibers from a given buffer tube being optically connected to a corresponding one of the multifiber connectors.

14. The assembly of claim 10, wherein the maintaining member is selected from the group of maintaining members comprising: tape, strapping, shrink tubing, shrink-wrap, binder, yarn, epoxy, urethane sealant, adhesive material, and combinations thereof.

15. The assembly of claim 10, wherein the stranded section is unidirectionally helically stranded.

16. The assembly of claim 10, wherein the fiber optic cable comprises a strength member that passes through the stranded section.

17. The assembly of claim 10, wherein the stranded portion has a lay length of between at least one of:
a) 10 mm and 100 mm;
b) 15 mm and 50 mm; and
c) 15 mm and 20 mm.

18. The assembly of claim 11, wherein the micromodules contained within the fiber optic cable are either generally unstranded or loosely stranded.

19. A fiber optic cable furcation assembly, comprising:
a fiber optic cable having an end and that contains multiple micromodules, with end portions of the micromodules extending from the cable end, and with each micromodule containing at least one optical fiber;
the micromodule end portions being unidirectionally helically stranded to define a stranded section extending between respective unstranded sections of the multiple micromodules and having a stranded configuration with at least three turns to substantially immobilize the optical fibers within their respective micromodules, wherein the micromodules contained within the unstranded sections of the fiber optic cable are either generally unstranded or more loosely stranded than in the stranded section of the micromodule end portions;
a maintaining member arranged on at least a portion of the stranded section; and
a plurality of multifiber connectors optically connected to the optical fibers.

20. The assembly of claim 19, wherein the optical fibers are bend-insensitive optical fibers.

21. The assembly of claim 19, wherein each micromodule includes a buffer tube that carries multiple optical fibers, with the multiple optical fibers from a given buffer tube being optically connected to a corresponding one of the multifiber connectors.

22. The assembly of claim 11, further comprising at least one multifiber connector optically connected to the optical fibers.

23. The assembly of claim 22, wherein each buffer tube includes multiple optical fibers, with the multiple optical fibers from a given buffer tube being optically connected to a corresponding one of the multifiber connectors.

24. The assembly of claim 11, wherein the maintaining member is selected from the group of maintaining members comprising: tape, strapping, shrink tubing, shrink-wrap, binder, yarn, epoxy, urethane sealant, adhesive material, and combinations thereof.

25. The assembly of claim 11, wherein the stranded section is unidirectionally helically stranded.

26. The assembly of claim 11, wherein the fiber optic cable comprises a strength member that passes through the stranded section.

27. The assembly of claim 11, wherein the stranded portion has a lay length of between at least one of:
  a) 10 mm and 100 mm;
  b) 15 mm and 50 mm; and
  c) 15 mm and 20 mm.

* * * * *